(12) United States Patent
Benveniste

(10) Patent No.: US 7,668,128 B1
(45) Date of Patent: Feb. 23, 2010

(54) FEATURES OF POWER SAVE IN 802.11E WIRELESS LOCAL AREA NETWORKS (WLANS)

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 393 days.

(21) Appl. No.: 11/124,797

(22) Filed: May 9, 2005

Related U.S. Application Data

(60) Provisional application No. 60/571,538, filed on May 17, 2004.

(51) Int. Cl.
G08C 17/00 (2006.01)
(52) U.S. Cl. .................. 370/311; 370/328; 370/338; 370/449; 370/468; 370/252
(58) Field of Classification Search ................ 370/252, 370/278, 294, 311, 329, 336, 345, 347, 348, 370/431, 447, 449, 462, 468, 338, 328; 455/343.2, 455/343.4, 452.1, 517, 522, 572, 574; 710/39
See application file for complete search history.

(56) References Cited

U.S. PATENT DOCUMENTS

| | | | | |
|---|---|---|---|---|
| 5,953,666 | A * | 9/1999 | Lehtimaki ................. | 455/439 |
| 6,963,549 | B1 * | 11/2005 | Jayaraman et al. ......... | 370/328 |
| 6,973,052 | B2 * | 12/2005 | Wang et al. ............... | 370/278 |
| 7,123,627 | B2 * | 10/2006 | Kowalski .................. | 370/468 |
| 7,194,261 | B2 * | 3/2007 | Emeott et al. ............. | 455/426.2 |
| 7,245,592 | B2 * | 7/2007 | Soomro et al. ............. | 370/311 |
| 2004/0042435 | A1 * | 3/2004 | Soomro et al. ............. | 370/338 |
| 2004/0143681 | A1 * | 7/2004 | Benveniste ................ | 709/249 |
| 2004/0184475 | A1 * | 9/2004 | Meier ...................... | 370/449 |
| 2004/0253996 | A1 * | 12/2004 | Chen et al. ................ | 455/574 |
| 2004/0258039 | A1 * | 12/2004 | Stephens .................. | 370/349 |
| 2004/0264397 | A1 * | 12/2004 | Benveniste ................ | 370/311 |
| 2005/0009578 | A1 * | 1/2005 | Liu ......................... | 455/574 |
| 2005/0018624 | A1 * | 1/2005 | Meier et al. ............... | 370/318 |
| 2005/0025167 | A1 * | 2/2005 | Ishibashi et al. ............ | 370/412 |
| 2005/0036448 | A1 * | 2/2005 | Leeuwen ................... | 370/235 |
| 2005/0047357 | A1 * | 3/2005 | Benveniste ................ | 370/311 |
| 2005/0124313 | A1 * | 6/2005 | Simpson et al. ............ | 455/343.3 |
| 2005/0135284 | A1 * | 6/2005 | Nanda et al. ............... | 370/294 |
| 2005/0136833 | A1 * | 6/2005 | Emeott et al. ............. | 455/11.1 |
| 2005/0152324 | A1 * | 7/2005 | Benveniste ................ | 370/338 |
| 2005/0157745 | A1 * | 7/2005 | Fujii et al. ................. | 370/449 |
| 2005/0174973 | A1 * | 8/2005 | Kandala et al. ............ | 370/338 |
| 2005/0213534 | A1 * | 9/2005 | Benveniste ................ | 370/328 |
| 2005/0249227 | A1 * | 11/2005 | Wang et al. ................ | 370/412 |
| 2005/0254459 | A1 * | 11/2005 | Qian ........................ | 370/328 |

(Continued)

*Primary Examiner*—Huy Phan
(74) *Attorney, Agent, or Firm*—Chapin IP Law, LLC; David W. Rouille, Esq.

(57) ABSTRACT

A method and apparatus for limiting the length of a service period in a Wireless Local Area Network (WLAN) including an Access Point (AP) and at least one station is presented. A maximum service period (SP) length for at least one station is determined. A value in a max SP length field in a control field of an uplink frame sent from said station to said AP is set. The value of the max SP length field is determined at the AP. Frame transmittal from the AP to the station is triggered during a service period when the value is non-zero, while downlink frame delivery from the AP to the station is prevented when the value is zero.

12 Claims, 4 Drawing Sheets

U.S. PATENT DOCUMENTS

2006/0020474 A1* 1/2006 Stewart et al. .............. 704/500
2006/0171362 A1* 8/2006 Garg et al. .................. 370/338
2006/0227801 A1* 10/2006 Nanda et al. ................ 370/447

* cited by examiner

FEATURES OF POWER SAVE IN 802.11E WIRELESS LOCAL AREA NETWORKS (WLANS)

CROSS REFERENCE TO RELATED APPLICATIONS

The present application claims the benefit of U.S. Provisional Patent Application No. 60/571,538, filed on May 17, 2004, which is incorporated herein by reference in its entirety.

BACKGROUND

A wireless local area network (WLAN) typically includes an Access Point (AP) and one or more stations. Each station may be a device such as a notebook computer, personal digital assistant (PDA), wireless VoIP telephone or the like that transmits radio signals to and receives radio signals from other stations in the local area network via the AP.

APs and stations transmit data in units referred to as frames over a shared-communications channel. Frames transmitted from a station to an AP are referred to as uplink frames, and frames transmitted from an AP to a station are referred to as downlink frames. In a situation where two or more stations (or an AP and a station) transmit frames simultaneously, then one or more of the frames can become corrupted, referred to as a collision. As a result, Wireless Local Area Networks (WLANs) typically employ one or more protocols to ensure that a station or AP can gain exclusive access to the shared-communications channel for a predetermined interval of time in order to transmit its frames without collisions occurring. Certain wireless network protocols (e.g., Institute of Electrical and Electronics Engineers [IEEE] 802.11, etc.) provide for the AP to periodically broadcast a special frame called a beacon that can be heard by the stations in the BSA (basic service area), the area covered by the AP. The beacon contains a variety of information that enables the stations to establish and maintain communications in an orderly fashion, such as a timestamp, which enables stations to synchronize their local clocks, and signaling information (e.g., channel number, frequency hopping pattern, dwell time, etc.).

A station can prolong its battery life by powering off its radio when not transmitting or receiving. When a station powers off its radio, the station is said to enter the "doze" state. A station wakes up from the doze state by powering on its radio to enter the "awake" state. While a station is in the doze state, it cannot transmit or receive signals, and is said to be asleep. A station that saves battery life by alternating between alert states and doze states is said to be in power save (PS) mode, and a station that employs PS mode is said to be a power saving station.

While a station is asleep, the AP buffers any downlink frames for the station for eventual delivery when station is in the awake state.

One method for receiving buffered frames is described in the IEEE 802.11-1999 standard, and is referred to herein as the "legacy" power save method. In this method, an AP periodically includes a Traffic Indication Map (TIM) in the beacon to identify which stations in power-save mode have downlink frames waiting in the AP's buffer for transmission.

In accordance with legacy power save method, stations in the doze state wake up to receive beacons and check the TIM. If the TIM indicates that there are frames buffered for the station, the station will send a PS Poll to request delivery of a buffered frame. To use PS polls, a station listens to the TIM in a beacon to determine if the AP has buffered frames for the station. When there are buffered frames for the station at the AP, the station sends a PS Poll to the AP signaling to the AP that the station is awake and waiting to receive a buffered frame. The AP sends a buffered frame to the station. If the frame has the "More Data" bit set to 1, indicating that there are more buffered frames for the station, the station will send another PS Poll to get another buffered frame. This is repeated until the AP has no more frames for the station.

Another strategy for delivering buffered packets in the AP to the appropriate station is known as Automatic Power Save Delivery (APSD), wherein the delivery of downlink buffered frames occurs without the need for PS Polls to indicate that the PS station is awake and ready to receive transmitted frames. There are two types of APSD: (i) scheduled APSD and (ii) unscheduled APSD. The two APSD variants differ with respect to initiation of the 'service period', which is the time period during which the PS station is presumed awake and able to receive a frame transmitted by the AP. With scheduled APSD, the service period starts automatically—that is, without special signaling frames to notify the AP that a station is awake and ready to receive frames. With unscheduled APSD, the transmission of an uplink frame is sufficient to signal the start of the service period, i.e., that the station is awake and ready to receive transmitted frames. The unscheduled service period begins when the AP receives from the station a QoS Data/Null frame. The station may elect to limit the access category (AC) of the frame that may initiate a service period. The AC(s) of the frames that may initiate a service period are designated by the station to through signaling such as an APSD TSPEC Another feature of APSD relates to the termination of the service period, the time interval a PS station must remain awake. Unlike legacy power save, where a PS station may go to sleep after receiving a single frame from the AP, APSD requires a PS station to stay awake to receive several buffered frames, and go to back to sleep only when it is notified by the AP. The AP sets the EOSP (end of service period) bit to 1 in the last frame it transmits in order to signal to the station that it will not transmit any more frames downlink until the next service period. This signals the station that it can go back to sleep.

SUMMARY

Conventional mechanisms such as the legacy power save method, scheduled APSD and unscheduled APSD methods explained above suffer from a variety of deficiencies. One such deficiency in conventional WLAN environments using the legacy power save is that it is possible for multiple stations in a network to repeatedly wake up at the same time (i.e., at the same beacons), resulting in traffic delays and a concomitant increase in station power consumption. The traffic delays may result from receiving a plurality of PS polls.

Another deficiency in conventional WLAN environments is that the legacy power save mechanism may be ill-suited for traffic with delay/jitter quality-of-service (QoS) requirements (i.e., voice calls, videophone calls, and the like) because wake-up periods based on multiples of beacon intervals may be too large for the inter-frame arrival times required for adequate call quality.

Systems employing the unscheduled APSD method as proposed to date does not efficiently retrieve non-periodic bursty traffic, as the definition of the TIM is limited to a subset of buffered frames only, those whose delivery relies on the legacy power save mechanism. Frames to be retrieved through unscheduled APSD would not be included in the TIM.

Embodiments of the invention significantly overcome such deficiencies and provide mechanisms and techniques that provide power save features in 802.11e wireless local area networks. Embodiments of the present invention enhance the unscheduled APSD power-save method in 802.11e by eliminating the need for signaling when using Unscheduled APSD, by unifying AP buffer architecture and by allowing PS stations to limit how much buffered traffic they receive in a service period. In a particular embodiment of a method for limiting the length of a service period in a Wireless Local Area Network (WLAN) including an Access Point (AP) and at least one station, the method includes determining a maximum service period (SP) length for at least one station. The method further includes setting a value in a max SP length field in a control field of an uplink frame sent from the station to the AP. Additionally, the method determines, at the AP, the value of the max SP length field (e.g. by evaluating the SP length field. Frame transmittal is triggered from the AP to the station during a service period when the value is non-zero, and downlink frame delivery from the AP to the station is prevented when the value is zero.

Other embodiments include a computer readable medium having computer readable code thereon limiting the length of a service period in a Wireless Local Area Network (WLAN) including an Access Point (AP) and at least one station. The medium comprises instructions for determining a maximum service period (SP) length for at least one station of said at least one station. The medium further comprises instructions for setting a value in a max SP length field in a control field of an uplink frame sent from said station to said AP and instructions for determining, at said AP, said value of said max SP length field. The medium additionally includes instructions for triggering frame transmittal from said AP to said station during a service period when said value is non-zero; and instructions for preventing downlink frame delivery from said AP to said station when said value is zero.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that limits the length of a service period in a WLAN as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations that limits the length of a service period in a WLAN including an AP and at least one station as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
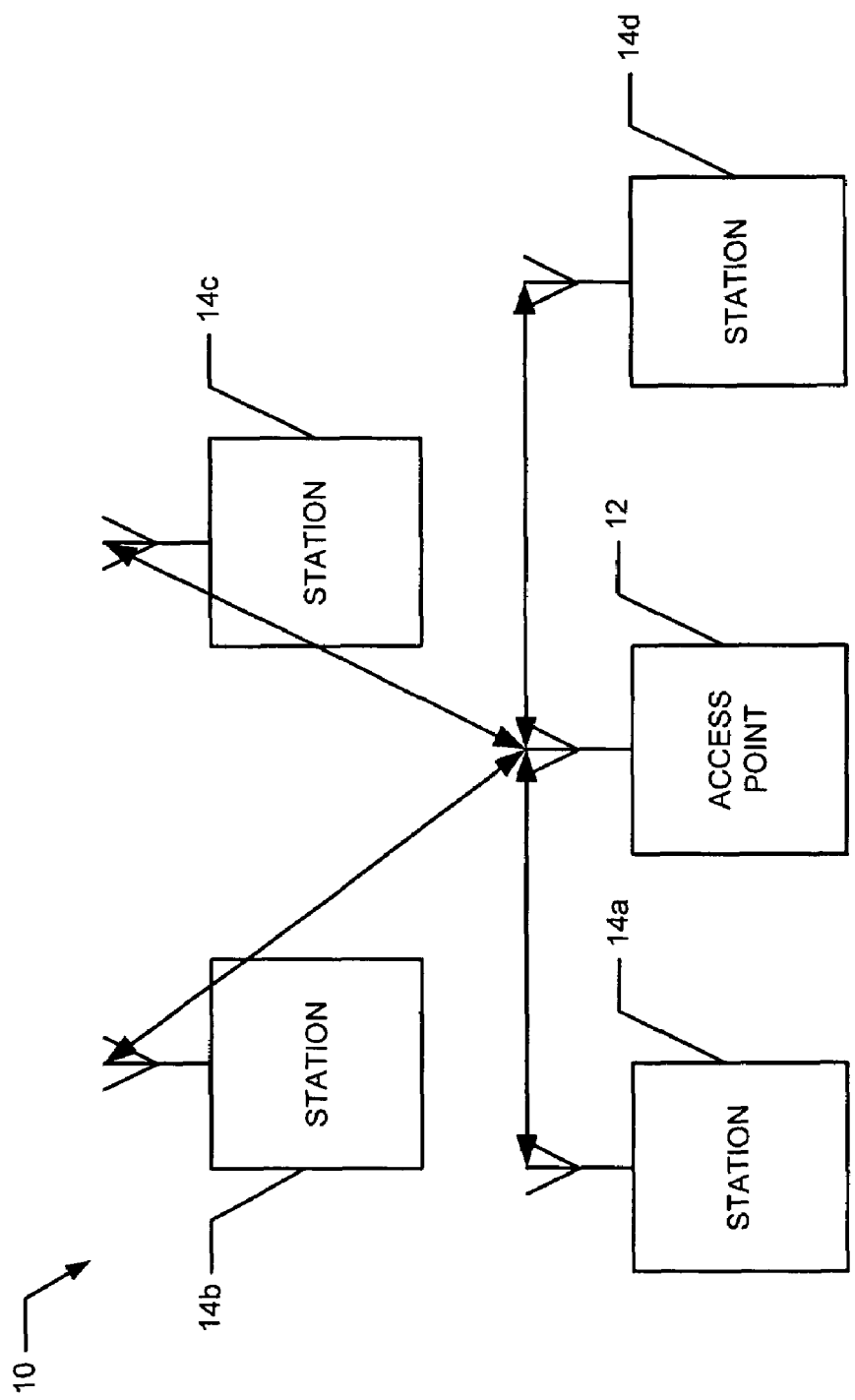
FIG. 1 comprises a block diagram of a particular embodiment of a wireless local area network environment in accordance with aspects of the present invention.

Referring to FIG. 1, a block diagram of a WLAN environment 10 in accordance with the present invention is shown. The environment 10 includes an AP 12 and a plurality of stations 14*a*-14*d*. While four stations are shown, it should be appreciated that any number of stations could be used. A station 14*a*-14*d* transmits frames over a wireless communications channel to the AP 12. A station 14*a*-14*d* is also capable of receiving frames over the wireless communication channel from the AP 12. A station is further capable of entering a power saving (PS) mode and of transmitting and receiving frames while in the power saving mode.

AP 12 receives frames from one or more stations 14*a*-14*d* via a wireless communications channel. AP 12 can also transmit frames to one or more stations 14*a*-14*d* via a wireless communications channel. AP 12 may further buffer downlink frames for a station which is in a doze state and may deliver the buffered downlink frames to the appropriate station when the station awakens from the doze state.

A station can prolong its battery life by powering off its radio when not transmitting or receiving. A station may be in one of two power management modes, an Active mode or a PS mode. As described above, frames destined for a station in PS mode may be buffered at the AP.

A station in PS mode may elect one of two methods for the delivery of its frames buffered at the AP while in the PS mode. One method is by using PS Polls. In PS polls, a station listens to a TIM to determine if the AP has buffered frames for the station. The station sends a PS Poll to the AP telling the AP that the station is awake. The AP sends a buffered frame to the station. If the frame has the "More Data" bit set, indicating that there are more buffered frames for the station, the station will send another PS Poll to get another buffered frame. This is repeated until the AP has no more frames for the station.

The other method is by using Automatic Power Saving Delivery (APSD). To use APSD, a station submits a Traffic Specification (TSPEC) request with the field APSD field set to indicate APSD is to be used (e.g. setting the APSD field to a 1) in accordance with earlier versions of the 802.11e draft. A TSPEC contains an estimate of the data traffic and associated requirements. All buffered frames associated with an admitted APSD TSPEC are transmitted during a service period also in accordance with earlier versions of the 802.11e draft. There are two types of service periods possible under APSD, unscheduled and scheduled, thus leading to two variants of APSD, namely Unscheduled APSD and Scheduled APSD. Unscheduled APSD can be used only with contention-based access, while Scheduled APSD can be used with both contention-based and polled access. APSD can be combined efficiently with traditional (legacy) power management features to accommodate mixed traffic.

Figure 2:
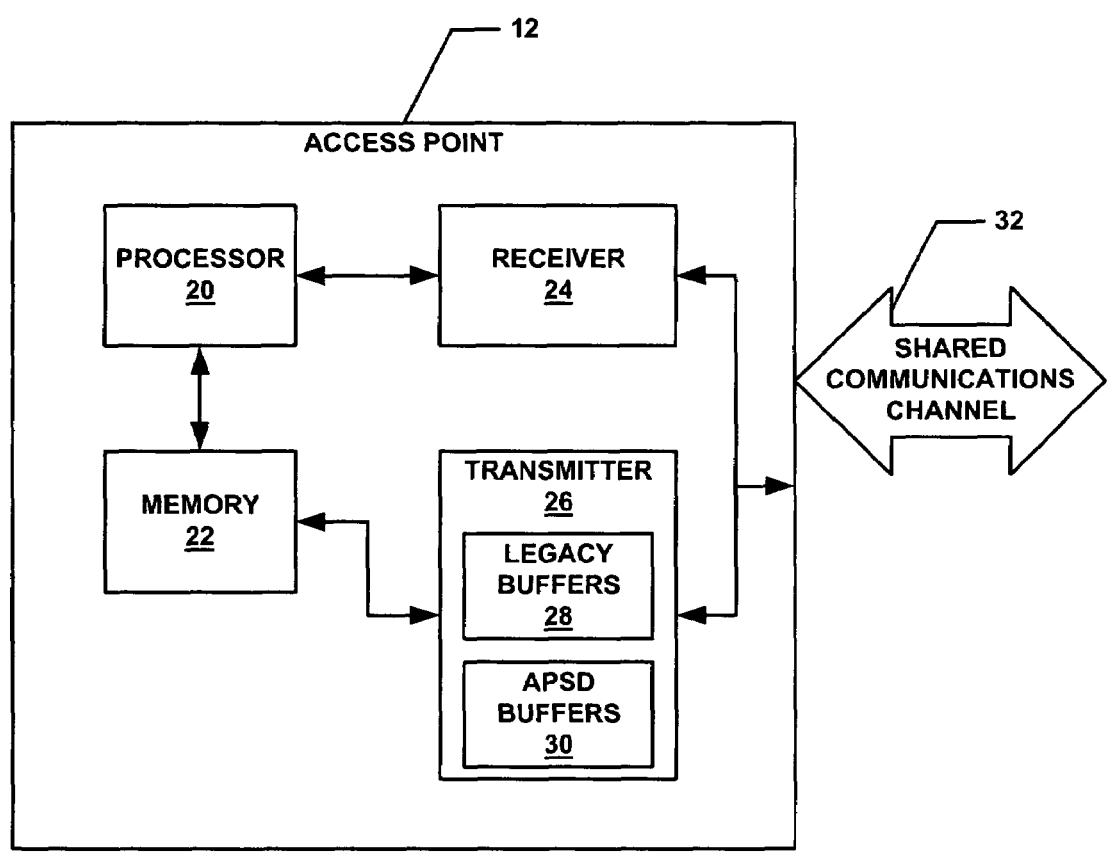
FIG. 2 depicts a block diagram of the salient components of an Access Point, in accordance with the illustrative embodiment of the present invention.

Referring now to FIG. 2, a block diagram showing salient components of a particular embodiment of an AP is shown. AP 12 includes processor 20, memory 22, receiver 24, and transmitter 26, interconnected as shown. Transmitter 26 includes legacy buffers 28 and APSD buffers 30.

Processor 20 is a general-purpose processor that is capable of executing instructions stored in memory 22, of reading data from and writing data into memory 22, and of executing various processes. Memory 22 is capable of storing programs and data used by processor 20, and might be any combination of random-access memory (RAM), flash memory, disk drive, and the like.

Receiver 24 is a circuit that is capable of receiving frames from shared communications channel 32, and of forwarding the received frames to processor 20. Transmitter 26 is a circuit that is capable of receiving frames from processor 20, and of transmitting the frames on shared communications channel 32. The transmitter includes at least one legacy buffer 28 and at least one APSD buffer 30. In order to avoid confusion on the signaling mechanism to be used for the delivery of buffered frames while stations in a WLAN engage in power saving, an AP 12 that supports APSD maintains one legacy PS buffer 28 for each non-APSD-capable station and at least one APSD buffer 30 per APSD-enabled station. Legacy buffers are not is maintained for APSD-enabled stations. An APSD enabled station is one that has indicated to the AP 12 its ability to use APSD signaling. Such a station utilizes APSD signaling to retrieve frames buffered at the AP.

All downlink frames destined to an APSD-enabled station in the sleep state are held in one of the APSD buffers 30. Which buffer that is depends on the frame's priority. For maximum prioritization, there is one APSD PS buffer for each AC and for each APSD-enabled station. Each APSD buffer would then hold frames corresponding to a different AC. An AP may maintain, however, fewer PS buffers per station than the number of APs in order to reduce cost or complexity. In such a case, frames corresponding to two different APs may be held in the same buffer.

In a particular embodiment, the AP includes a processor, a memory in communication with the processor, a receiver in communication with the processor and with a shared communications channel, and a transmitter in communication with the processor and with the shared communications channel. The transmitter includes a legacy power saving buffer for each non-Automatic Power Save Delivery (APSD) station of a Wireless Local Area Network (WLAN) the AP is in communication with, at least one APSD buffer for each APSD enabled station of the WLAN. During a service period, frames from the at least one APSD buffer are transmitted by the transmitter across the shared communications channel to an APSD enabled station.

The AP may further include one APSD buffer for each Access Category (AC) for each APSD enabled station or may include one APSD buffer for multiple Access Categories (for each APSD enabled station. In either case, the ACs of frames in one APSD buffer have a different priority level than other ACs of frames of another buffer.

Frames are transmitted from a single APSD buffer of the transmitter during a service period. Preferably, the frames are transmitted from a buffer containing highest priority frames. To ensure that the frame with the EOSP bit set to 1 is the last frame transmitted to the station during a service period, the service period is ended by the AP when the AC corresponding to the next frame to be released changes.

Alternatively, frames of multiple ACs may be transmitted in the same service period provided the frames are transmitted from a same Enhanced Distribution Channel Access (EDNA) access/transmit buffer. When a service period (either scheduled or unscheduled) starts for a station, the AP will release frames to be sent to the station. This may be accomplished using Enhanced Distributed Channel Access (EDCA), a mechanism in which devices contend for the channel based on up to eight levels of priority. Certain precautions are taken in order to avoid the station going to sleep before receiving all frames sent by the AP during the service period, which is possible when frames of different ACs are sent using EDCA, causing the frame with the EOSP bit set to be received before other frames released in the same service period. One precaution is to always send frames from a single buffer per service period. The EOSP bit is set in the last released frame. Although more frames are queued in another buffer, the AP will wait for a new service period to release those frames. In addition to releasing frames from a single buffer during a service period for a particular station, the released frames must all use the same EDCA access/transmit buffer.

Alternatively, frames of multiple ACs may be transmitted in the same service period provided the frames are transmitted from a same Enhanced Distribution Channel Access (EDNA) access/transmit buffer, using the same channel access parameters for all ACs.

Figure 3:
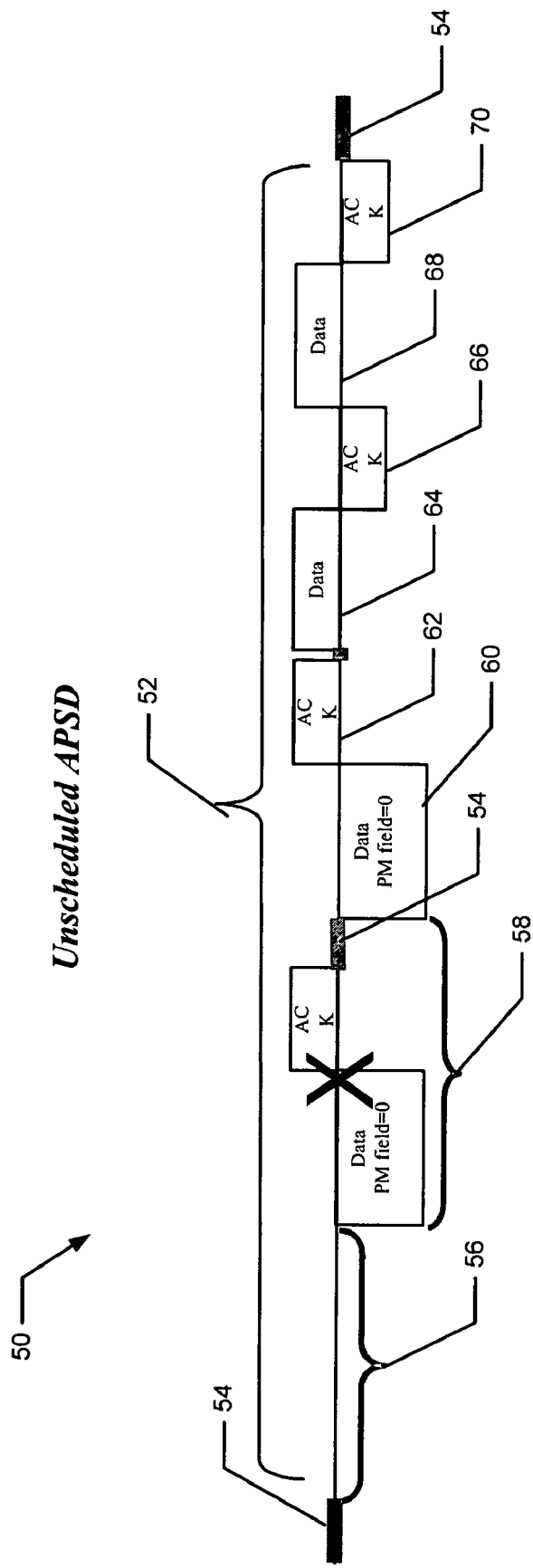
FIG. 3 comprises a diagram of the awake time for a station in unscheduled APSD.

Referring now to FIG. 3, a diagram of the data flow 50 during unscheduled APSD is shown. The time the station is awake is during interval 52. At other times 54, contention may occur. A collision 58 is shown which takes place after a waiting period 56. This waiting period is to allow the AP to finish transmitting. As shown during unscheduled APSD, data 60, 64 and 68 and the corresponding acknowledgements (ACKs) 62, 66 and 70 take place, however collisions are possible. The Unscheduled APSD option does not require a service period schedule to be generated by the AP, while scheduled APSD does.

A station in PS mode may use both delivery mechanisms at the same time for different types of traffic. Integration is useful when the downlink traffic is mixed, as for example when the buffered frames comprise a high-priority periodic traffic stream for which a scheduled APSD TSPEC has been admitted and low-priority data bursts possibly without a time pattern or predictability. All buffered frames associated with an admitted scheduled APSD TSPEC are transmitted during a service period. If traffic remains buffered at the AP at the end of a service period, the AP sets the End of Service Period (EOSP) field to 1 and the More Data field to 1. The station with frames remaining buffered at the AP at the end of a service period may receive its frames from the AP buffer either through the use of PS Polls, or by transitioning to Active mode until it receives its remaining buffered frames, and then transitioning back to the PS mode.

For integration of the legacy power saving delivery mechanism with Unscheduled APSD to be efficient, it is important that there exist an uplink periodic traffic stream. Generating QoS Null frames and transmitting them uplink just to find out whether there are buffered frames at the AP is inefficient from both a power consumption and channel use perspective. It is more efficient to wake up at the beacon to listen to the TIM, which indicates the presence of frames of any AC buffered at the AP, and then retrieve the buffered data by any of the available methods. That is, by sending a QoS Data/Null frame, by transitioning to the Active state temporarily or by sending a PS Poll, depending on how much data is buffered.

In order to provide more control to the station on the amount of buffered traffic sent per Service Period (SP), the station may indicate in a trigger frame the maximum number of frames in an SP. When set to a non-zero value, it indicates the upper bound on how many frames should be transmitted by the AP to the PS station. Limiting the length of downlink transmission enables stations to tend to other time-critical functions as needed.

The maximum service period length may be indicated as a field in the control field of an uplink frame. A non-zero value for the SP length limit of an uplink data frame marks that frame as a trigger. No frames may be transmitted by the AP in response to receiving an uplink frame; this disqualifies a frame as a trigger for a downlink transmission to the PS station. A station with a string of uplink frames would thus make the first frame in the string a trigger.

By way of the present invention, in a particular embodiment, a station can send a maximum service period length to the AP by either setting the appropriate bits in the control field of an uplink frame (a value indicating the service period length) or by sending an uplink frame which can be used as a marker (SP length bit set to a zero value) or as a trigger (SP length bit set to a 1).

When the SP length value is set to a zero, if a station gets a burst of data to send to an AP, every frame does not have to be viewed as trigger. It can send a null frame and go back to sleep. When it receives a new frame, it can trigger on the first frame, the last frame (preferred), or any other frame; and send a null frame with the EOSP bit on as an acknowledge, then end the service period.

On the other hand, when the SP length value is set to a one, there is no signaling required to indicate the station is in APSD. The AP saves buffered frames, and sends one frame per PS poll. When the AP receives an uplink frame as a marker, this indicates the station can handle Unscheduled APSD, and to send all frames with the last frame having the EOSP bit set to indicate there are no more frames for the station at the AP.

Figure 4:
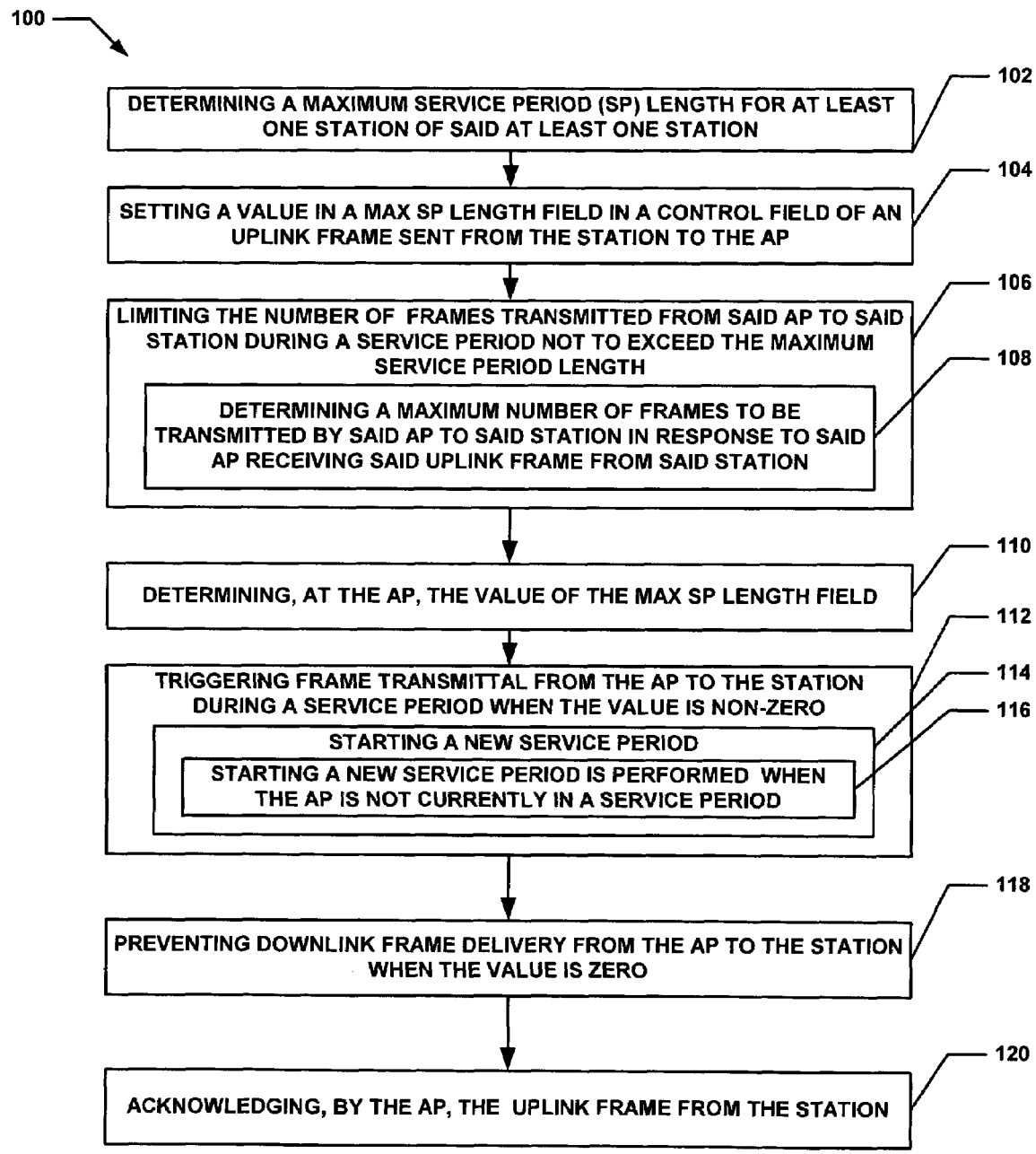
FIG. 4 comprises a flow diagram of a particular embodiment of limiting the length of a service period in a WLAN including an Access Point (AP) and at least one station in accordance with embodiments of the present invention.

A flow chart of the presently disclosed method is depicted in FIG. 4. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a particular embodiment of a method 100 for limiting the length of a service period in a WLAN including an AP and at least one station is shown. The method begins with processing block 102 wherein a maximum service period (SP) length for at least one station is determined. As shown in processing block 104 a value in a max SP length field in a control field of an uplink frame sent from the station to the AP is set. This can act as a trigger frame.

In processing block 106, the number of frames transmitted from the AP to the Station during a service period is limited so that the maximum service period length is not exceeded.

In processing block 108, determining a maximum service period comprises determining a maximum number of frames to be transmitted by the AP to the station in response to the AP receiving the uplink frame from the station. In processing block 110, at the AP, the value of the max SP length field is determined. In processing block 112 frame transmittal from the AP to the station is triggered during a service period when the value is non-zero.

In processing block 114, the triggering frame transmittal comprises starting a new service period. In processing block 116, the starting of a new service period is performed when the AP is not currently in a service period.

In processing block 118, downlink frame delivery from the AP to the station is prevented when the value is zero. In processing block 120, the AP acknowledges the uplink frame from the station.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method for limiting the length of a service period in a Wireless Local Area Network (WLAN) including an Access Point (AP) and at least one station, the method comprising:
   utilizing unscheduled Automatic Power Save Delivery (APSD) for delivering packets in said WLAN;
   determining a maximum service period (SP) length for at least one station of said at least one station:
   setting a value in a max SP length field by said station to said AP;
   limiting the number of frames transmitted from said AP to said station during a service period not to exceed the maximum service period length, wherein said limiting comprises determining a maximum number of frames to be transmitted by said AP to said station in response to said AP receiving said uplink frame from said station;
   determining, at said AP, said value of said max SP length field;
   triggering frame transmittal from said AP to said station during a service period when said value is non-zero; wherein said triggering frame transmittal comprises starting a new service period, and wherein said triggering frame transmittal further comprises eradicating certain signaling requirements for unscheduled APSD, wherein when said triggering frame transmittal from said AP to said station during a service period when said value is non-zero comprises sending one frame per PS poll; and
   preventing downlink frame delivery from said AP to said station when said value is zero.

2. The method of claim 1 further comprising acknowledging, by said AP, said uplink frame from said station.

3. The method of claim 1 wherein said starting a new service period is performed when said AP is not currently in a service period.

4. The method of claim 1 wherein said eradicating certain signaling requirements comprises eradicating the transmitting of a Traffic Specification (TSPEC).

5. A computer readable storage medium having computer readable code thereon for limiting the length of a service period in a Wireless Local Area Network (WLAN) including an Access Point (AP) and at least one station, the medium comprising:
   instructions for utilizing unscheduled Automatic Power Save Delivery (APSD) for delivering packets in said WLAN;
   instructions for determining a maximum service period (SP) length for at least one station of said at least one station:
   Instructions for setting a value in a max SP length field by said station to said AP;
   Instructions for limiting the number of frames transmitted from said AP to said station during a service period not to exceed the maximum service period length, wherein said instructions for limiting comprises instructions for determining a maximum number of frames to be transmitted by said AP to said station in response to said AP receiving said uplink frame from said station, wherein said instructions for triggering frame transmittal comprises instructions for starting a new service period, and wherein said instructions for triggering frame transmittal further comprises instructions for eradicating certain signaling requirements for unscheduled APSD;
   instructions for determining, at said AP, said value of said max SP length field;
   instructions for triggering frame transmittal from said AP to said station during a service period when said value is non-zero, wherein when said triggering frame transmittal from said AP to said station during a service period when said value is non-zero comprises sending one frame per PS poll; and
   instructions for preventing downlink frame delivery from said AP to said station when said value is zero.

6. The computer readable medium of claim 5 further comprising instructions for acknowledging, by said AP, said uplink frame from said station.

7. The computer readable medium of claim 5 wherein said instructions for starting a new service period is performed when said AP is not currently in a service period.

8. The computer readable medium of claim 5 wherein said instructions for eradicating signaling requirements comprise instructions for eradicating transmitting a Traffic Specification (TSPEC).

9. A computer system comprising:
   a memory;
   a processor;
   a communications interface;
   an interconnection mechanism coupling the memory, the processor and the communications interface; and
   wherein the memory is encoded with an application that when performed on the processor, provides a process for limiting the length of a service period in a Wireless Local Area Network (WLAN) including an Access Point (AP) and at least one station, the process causing the computer system to perform the operations of:
   utilizing unscheduled Automatic Power Save Delivery (APSD) for delivering packets in said WLAN;
   determining a maximum service period (SP) length for at least one station of said at least one station:
   setting a value in a max SP length field by said station to said AP;
   limiting the number of frames transmitted from said AP to said station during a service period not to exceed the maximum service period length, wherein said limiting comprises determining a maximum number of frames to be transmitted by said AP to said station in response to said AP receiving said uplink frame from said station;
   determining, at said AP, said value of said max SP length field;
   triggering frame transmittal from said AP to said station during a service period when said value is non-zero; wherein said triggering frame transmittal comprises starting a new service period, and wherein said triggering frame transmittal further comprises eradicating certain signaling requirements for unscheduled APSD and wherein when said triggering frame transmittal from said AP to said station during a service period when said value is non-zero comprises sending one frame per PS poll; and
   preventing downlink frame delivery from said AP to said station when said value is zero.

10. The computer system of claim 9 further comprising acknowledging, by said AP, said uplink frame from said station.

11. The computer system of claim 9 wherein said starting a new service period is performed when said AP is not currently in a service period.

12. The computer system of claim 9 wherein said eradicating certain signaling requirements comprises eradicating the transmitting of a Traffic Specification (TSPEC).

* * * * *